United States Patent [19]
Latocha et al.

[11] Patent Number: 5,790,371
[45] Date of Patent: Aug. 4, 1998

[54] MODULAR AND EXTENDIBLE ELECTRONIC WORKING SURFACE

[75] Inventors: Wanda Latocha, München; Ingolf Karls, Feldkirchen, both of Germany

[73] Assignee: Siemens Aktiengesellschaft, Munich, Germany

[21] Appl. No.: 765,543

[22] PCT Filed: Jul. 3, 1995

[86] PCT No.: PCT/DE95/00856

§ 371 Date: Jan. 8, 1997

§ 102(e) Date: Jan. 8, 1997

[87] PCT Pub. No.: WO96/02030

PCT Pub. Date: Jan. 25, 1996

[30] Foreign Application Priority Data

Jul. 8, 1994 [DE] Germany ............... 44 24 138.0

[51] Int. Cl.$^6$ .................................................. G06F 1/16
[52] U.S. Cl. ....................... 361/683; 345/1; 345/903; 361/681
[58] Field of Search ....................... 361/681, 682, 361/683, 686; 345/1, 2, 3, 903, 905, 173; 364/708.1

[56] References Cited

U.S. PATENT DOCUMENTS

| | | | |
|---|---|---|---|
| 4,368,467 | 1/1983 | Unotoro et al. | 340/799 |
| 4,408,836 | 10/1983 | Kikuno | 350/334 |
| 4,720,781 | 1/1988 | Crossland et al. | |
| 4,769,764 | 9/1988 | Levanon | |
| 4,791,417 | 12/1988 | Bobak | 340/784 |
| 5,128,662 | 7/1992 | Failla | 340/752 |
| 5,523,769 | 6/1996 | Lauer et al. | 345/1 |

FOREIGN PATENT DOCUMENTS

| | | |
|---|---|---|
| 0 251 492 | 1/1988 | European Pat. Off. . |
| 0 378 889 | 7/1990 | European Pat. Off. . |
| 0 546 704 | 6/1993 | European Pat. Off. . |
| 0 604 719 | 7/1994 | European Pat. Off. . |
| 35 11 353 | 10/1986 | Germany . |
| 37 00 765 | 7/1988 | Germany . |
| 42 18 179 | 12/1993 | Germany . |
| 42 44 584 | 7/1994 | Germany . |

OTHER PUBLICATIONS

S. Depp et al., "Flat–Panel Displays", Scientific American, Mar. 1993, pp. 40–45.
W. Müller: Steigende Netzspannung, Öffentliche netzwerke, SCREEN Multimedia, Mar. 1994, pp. 20–23.
M. Radcliffe, "Let Your Agent To The Walking", Top of the News, PC World, Feb. 1994, pp. 56, 58 and 92–101.

Primary Examiner—Lynn D. Feild
Attorney, Agent, or Firm—Hill & Simpson

[57] ABSTRACT

Modular and extendible electronic working surface made of basic elements which can be plugged together reversibly, whose top surfaces are configured as sensitive flat panel devices and which can exchange data with one another. Some or all the basic elements are equipped with memories and processors, have the basic functionality of a personal computer, and are able to communicate with external devices and data networks. The working surface can be used by a user or a plurality of users together as a universal, variable-size and mobile device for the input, output, processing and storage of data and as a data communications terminal device.

4 Claims, 3 Drawing Sheets

MODULAR AND EXTENDIBLE ELECTRONIC WORKING SURFACE

BACKGROUND OF THE INVENTION

1. Field of the Invention

The present invention relates generally to a display for a computer system, and in particular to a modular display that are selectively connected to one another.

2. Description of the Related Art

In spite of the increasing spread of personal computers, the possibilities for application and use of these products are limited. It is still the case that dealing with conventional means of working such as "pencil and paper" is in many cases simpler, more intuitive and more efficient. Some users wish to have a universally employable mobile personal computer whose use is as simple and intuitive as the use of "pencil and paper", but the functionality of conventional personal computers is intended to be as far as possible unrestrictedly available.

SUMMARY OF THE INVENTION

The present invention relates to a modular and extendible electronic working surface which is intended to meet this requirement.

U.S. Pat. No. 4,720,781 (Crossland et al.) discloses a data processing device with a flat screen based on liquid crystal displays, the flat screen being able to be removed from the main unit and being equipped with its own processor and memory and its own control and power supply. German Patent DE 3700765 C2 discloses a display device for the static and dynamic display of an item of information on a display field which is arranged like a matrix and has light-emitting elements and has display columns and rows, is composed of constructional units which are lined up in a row and can be connected mechanically and electrically and is equipped with a programmable electronic contro3 circuit. German Offenlegungsschrift (laid-open application) DE 42 44 584 A1 discloses a method and an arrangement for interlinking electrooptical picture wall modules with the aid of optical bus systems.

These known objects and other conventional devices with this objective, "notebooks", "personal digital assistants" or "pen computers", by comparison with the use of "pencil and paper", have inter alia the disadvantage that the working area (working surface) which is available is restricted and is fixedly prescribed by the manufacturer of the device, or that they do not combine the following properties:

flexible arrangement and size of the screens, sensitive top surfaces, that is to say input functionalities directly on the screen, mobility (easily portable, usable without a mains connection).

Furthermore, conventional personal computers are characterized by a fixedly limited screen size and by a strictly two-dimensional display surface.

The invention is based on the object of providing an electronic working surface with a sensitive top surface, in which the arrangement and size of the working surface can be adapted to the purpose of use. This and other objects are achieved, according to the invention, by a modular and extendible electronic working surface in which the working surface comprises a plurality of basic elements which are plugged together; the working surface can be enlarged or reduced or divided by the addition of further basic elements or by taking away basic elements; the top surfaces of at least two basic elements are configured as a sensitive flat screen with which data can be displayed and via which data can also be input into the working surface, the at least two basic elements in each case having at least one processor with which application programs can be processed; the side surfaces of a basic element are provided with devices which make possible the reversible plugging together of the basic elements and an exchange of data between the basic elements; at least some of the basic elements have a functionality which is independent of other basic elements, and at least some of the basic elements can exchange data via the devices, as a result of which a joint functionality of the respective basic elements is realized.

According to the latter, the working surface comprises one or more basic elements which are plugged together, with the result that by means of adding further basic elements or by taking away basic elements the working surface can be enlarged, reduced or divided. The top surface of a basic element is configured as a sensitive flat screen (flat panel display), with which data can be displayed and via which data can also be input into the working surface. The side surfaces of a basic element are provided with devices which make possible the reversible plugging together of the basic elements and an exchange of data between the basic elements.

The invention therefore makes possible for the user a use in imitation of the "pencil and paper" metaphor. In contrast with conventional so-called "electronic paper" (see Weiser, M.: The Computer for the 21st Century, Scientific American, September 1991, pp. 66–75.), which comprises a single flat panel display, which, although it communicates in a wireless manner with other data processing devices, its size and shape are fixedly prescribed, the invention enables the user to work on a surface which can be flexibly arranged and varied in size and has uniform properties.

Advantageous developments of the invention are provided by the at least one basic element being equipped with a data memory. The at least one basic element is equipped with a device for data transmission to and/or for data acceptance from an external data processing device and/or peripheral device and/or data communications network in a preferred embodiment. At least one of the basic elements is plugged together with another basic element in such a way that the angle between these two basic elements can be varied.

In a preferred embodiment of the invention, the equipment of one or more basic elements with a processor is provided. This embodiment of the invention makes the running of suitable software on the processor possible, as a result of which the communication of the working surface with the user and the behavior of the working surface from the point of view of the user can be improved. The software could, for example, support the drawing of geometric figures or recognize the handwriting of the user and convert it automatically into typed characters.

Still more flexible is a further preferred embodiment of the invention, in which a data memory is provided in at least one basic element. In the case of this embodiment of the invention, the storage of user data is possible without a connection to external storage media. Furthermore, it is possible for the user to load further programs which equip the working surface with an expanded functionality.

Further preferred embodiments of the working surface according to the invention provide for basic elements with devices for data transmission or acceptance to and from further external data processing devices or peripheral devices or for communication with other computers via data communications networks. By means of these measures, the working surface according to the invention becomes a variable terminal device for information networks. Furthermore, the output of data to external peripheral devices such as, for example, printers or the acceptance of data from further data processing systems becomes possible.

In the case of a further preferred embodiment of the invention, the mechanical connection between the basic elements is configured in such a way that the angle between two basic elements can be varied. This measure makes possible extremely flexible handling of the working surface according to the invention, such as for example the folding together of a working surface to facilitate its transport or the construction of three-dimensional constructions such as, for example, cubicles or presentation walls.

In the case of a further preferred embodiment of the invention, the equipping of at least one basic element with the basic functionality of a personal computer is provided. In addition to a processor and a main memory, in this case accordingly at least one basic element is equipped with operating system software which permits the opening and storage of files, the calling up of programs and input and output into and from files. A working surface of this type is a complete replacement for a personal computer with the advantage of flexible arrangement and selection of the size of the input/output surface. If at least two basic elements are equipped as PCs, then the user can use these PCs separately or in cooperation, depending on the user's choice, the two basic elements being able to behave together as one personal computer. On these working surfaces it is then possible for one application or several applications to run simultaneously, these applications being able to be used by several users together or separately, depending on the choice of the one or more users. Furthermore, depending on the choice of the user or the users, the entire working surface can be distributed to all applications; as an alternative to this, various applications can run in various regions of the overall working surface.

BRIEF DESCRIPTION OF THE DRAWINGS

FIGS. 3a, 3b, and 3c show in schematic form one possible embodiment of the device for plugging the basic elements together.

DETAILED DESCRIPTION OF THE PREFERRED EMBODIMENTS

The invention is described in more detail below using preferred exemplary embodiments and with the aid of the figures.

In the course of the construction of information networks, the users need a flexible terminal device which offers convenient working capabilities even in the case of different usages. The following properties are expected of such a flexible terminal device:

adaptation of the arrangement and size of the working surface to the purpose of use and not the other way round, mobility and adaptation of the device to different workplaces, as well as different expansion stages for various user circles and applications.

Figure 1A:
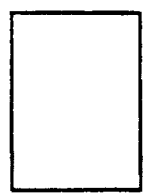
FIGS. 1a, 1b, 1c, 1d, 1e, and 1f show in schematic form various examples of electronic working surfaces according to the invention having different compositions of basic elements.
Figure 1B:
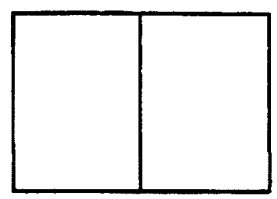
Figure 1C:
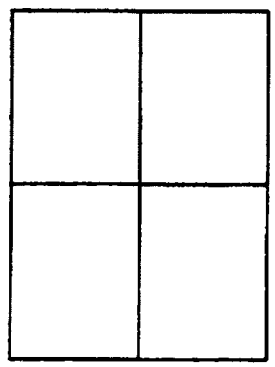
Figure 1D:
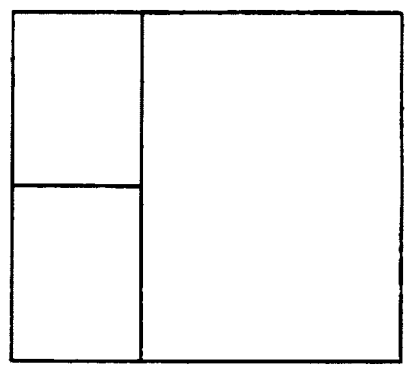
Figure 1E:
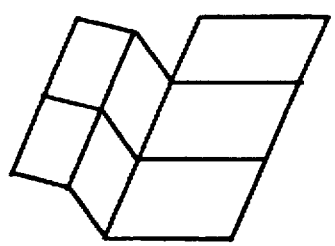
Figure 1F:
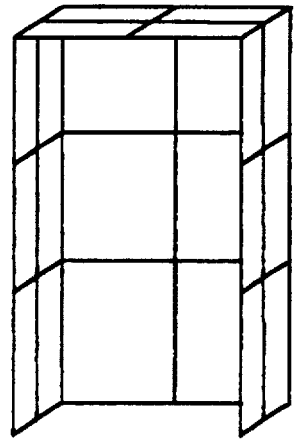

The invention is aimed, inter alia, at the goal of providing a flexible terminal device for information networks with the properties outlined above. This device is naturally intended to be able to be used in a sensible and useful manner, even without a mains connection, for example as a notebook, a PDA or PC. The device according to the invention comprises a modular system of flat or panel-shaped basic elements which are equipped as sensitive flat panel displays, preferably with personal computer functionalities and communication capabilities. The flat basic elements may exist in different sizes in this arrangement. This is represented schematically in FIG. 1, in particular in FIGS. 1a, b, c and d. They may be put together in a flexible manner—in one plane or at different angles (FIGS. 1e, f). Each basic element can be used on its own or in combination with other basic elements. In this case it is possible to use both various applications in parallel on one working surface (for example like a Windows system), or else spread individual applications out over a plurality of basic elements. The working surface according to the invention is mobile, that is to say the basic elements can be transported individually or folded together and can also be used folded together.

On account of these flexible properties of the basic elements, the working surface according to the invention is a device which is suitable for many target groups and applications. It is especially suitable for uses which need the flexible employment of working surfaces (with regard to size, arrangement or place of use) or need very large presentation surfaces. Some possible forms of use are listed below by way of example:

Workplaces at which the same device is used for working at the desk and for presentation.

Workplaces at which several persons share such a device, that is to say take it to their workplace as required.

Large, flexibly usable presentation surfaces in control rooms.

Large presentation surfaces in conference rooms.

Cubicles in games halls for the display of virtual worlds.

Displays for flight simulators.

A small working surface for each member of the family; this working surface can be used in school, at the desk, in an armchair, etc. If only one member of the family is working with the working surface according to the invention, they can plug together all the basic elements available to make one larger working surface.

In a preferred embodiment, the working surface according to the invention makes available basic functionalities which can be supplemented with special applications for specific user groups. Possible basic functionalities of a working surface according to the invention are:

The usual functionalities of a personal computer.

Communications services, such as telephone, fax, E-mail, etc.

Connection to an information network (D-network, etc.) and its services wireless and hard-wired connection).

Multimedia and multimodal user interface.

Further service features of the device according to the invention result from its modular construction as a modular system. The arrangement and size of a working surface may be adapted to the respective purpose of use. This is of interest even in the case of simple, everyday work, for example if a secretary wishes to work on several pages of a relatively long text at the same time on her screen. The device is mobile, that is to say can be employed at various locations. It satisfies the requirements of different workplaces. For instance, it can be placed on a desk, hung on the wall for presentation, it can be worked on at home in the armchair, a cubicle made of working surfaces can be produced, and so on. The basic elements of the electronic working surface according to the invention can be purchased in sizes appropriate to the purpose and are easy to expand. This meets the requirement of different user groups. Thus, for example, private or individual persons normally require only a few small working surfaces, whereas in conference rooms of companies, large, wall-covering working surfaces are often needed. Finally, information studios need cubicles made of working surfaces, etc.

Figure 3A:
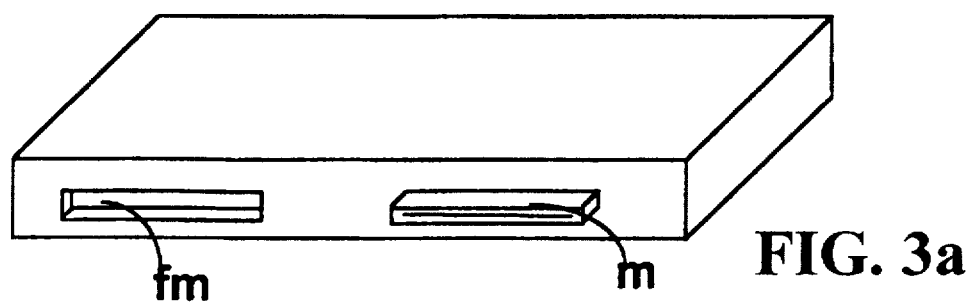
Figure 3B:
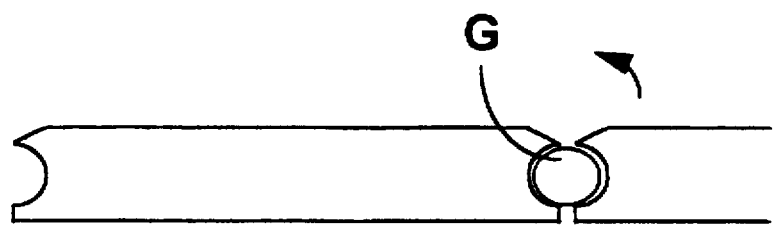

The working surface according to the invention is equivalent to a modular system with the capability of the flexible coupling to one another of arbitrarily many, essentially similar basic elements. In this case, the coupling contains both a mechanical connection which is fixed but detachable at any time (see FIG. 3) and also the capability of exchanging power and data. In FIG. 3, by way of example, two possible embodiments of the mechanical coupling of the basic elements are represented schematically. FIG. 3a shows a side view of an essentially box-shaped basic element, whose side surfaces are equipped with male (m) and female (fm) plug devices which engage in each other when the basic elements are plugged together, and thus produce an electrical and mechanical connection between the basic elements. FIG. 3b shows a side view of two basic elements connected with the aid of an essentially cylindrical connecting element (G). In each case one half of the connecting element—that is to say in each case a part-cylinder of half the length—is plugged together with in each case one basic element—for example with the aid of plug devices in accordance with FIG. 3a. Since the two part-cylinders can be rotated in relation to one-another about a common axis, the angle between the basic elements can be varied, as indicated in FIG. 3b. Since connection constructions of this type are known in the field of data processing, principally from other applications (for example cable plug connections, plug-in cards, connection of monitor and keyboard in the case of a notebook, etc.), the person skilled in the art will find no more difficulty, after having read this present patent application, now to use these constructions in the sense of the present invention, with the aid of the figures. A more extensive representation of this technique within the context of the present application may therefore be omitted, considering the clarity offered by the present embodiments.

Figure 2A:
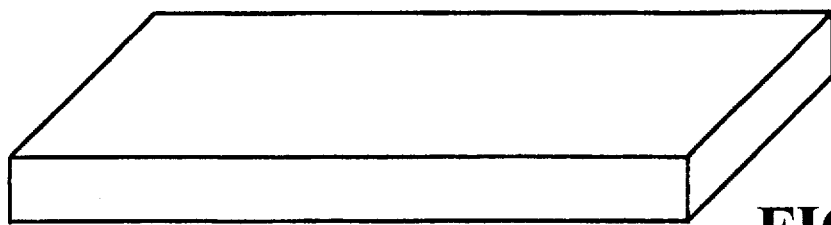
FIGS. 2a, 2b, and 2c show in schematic form various examples of basic elements for the electronic working surface according to the invention.
Figure 2B:
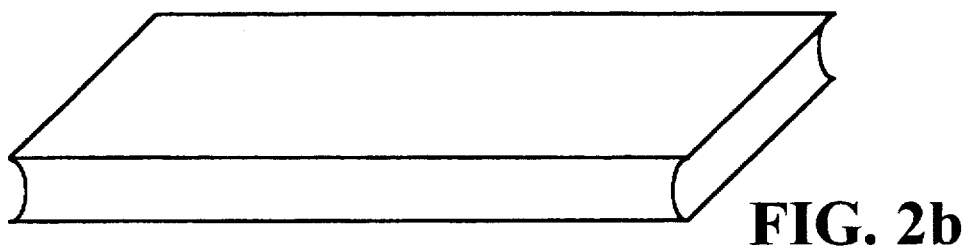
Figure 2C:
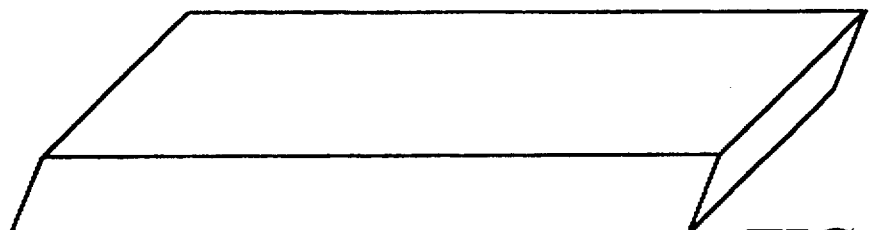

The basic elements are in this case typically prism-shaped or panel-shaped or disk-shaped or plate-shaped devices (cf. FIG. 2), which integrate a sensitive flat panel display (screen with input functionality) and an associated computer unit or even a plurality of computer units (processors etc.). In this case the basic elements do not have to be "prism-shaped" in the strict meaning of the word, although this will often be the case. Rather, any three-dimensional body which has a top surface which can be used for the display and input of data and which has side surfaces which allow the mechanical and electronic coupling of a plurality of basic elements to form a larger working surface is suitable as basic element. On the basis of these guidelines, it is clear to those skilled in the art that the top surface of the basic elements can also be curved, that furthermore the parallel or only approximately parallel basic surfaces of basic elements do not necessarily have to be exactly coincident, and that the side surfaces do not necessarily have to be flat but can also be curved; on the basis of these guidelines, it is clear to those skilled in the art that the decisive property of the basic elements is the ability to write on them—for example using a data input pen which is suitable for this—and their ability to be able to be put together to form a flexible working surface.

A further important feature of the working surface according to the invention is the flexible size and arrangement of the screen surface. In a manner similar to the use of paper, which can simply be put together to form larger surfaces or can be subdivided into smaller surfaces, the user has the possibility of putting together different basic elements, entirely according to his choice, to form a larger screen, which does not necessarily have to have the form of a flat plane but, as already mentioned, can be arranged so that it can be folded together or can be set up as a cubicle. Finally, an important property of the working surface according to the invention is its mobility, which results from the low weight of the basic elements and their independence of a mains connection, this independence being able to be achieved, for example, by the use of batteries, rechargeable batteries or photovoltaic elements.

The working surface according to the invention differs from conventional screen walls through the coupling of the individual basic elements (screen elements) with one another, without a central unit being needed, through the flexible arrangement of the screen surfaces and through the direct data exchange between the basic elements. By contrast, in the case of conventional screen elements, a central unit is needed for driving all the screens; the screens do not exchange any data between themselves. Normally, the screens of a screen wall cannot be arranged flexibly.

The working surface according to the invention differs from conventional notebooks or notepad computers in the fact that, in the case of the working surface according to the invention, identical basic elements can be coupled to one another in unrestricted numbers, whereas in the case of conventional notepads and notebooks a coupling of this type is not provided. Although a few commercially available notepad computers can communicate with one another via cable or infrared connections, this communication does not allow the user to construct a single, larger homogeneous working surface from individual notepad computers.

The electronic paper described by Weiser, M.: The Computer for the 21st Century, Scientific American, September 1991, pp. 66–75, differs finally from the working surface according to the invention in that the working surface according to the invention has a modular structure and does not represent a single device with a fixed arrangement and size of the screen.

Sensitive flat screens, also called sensitive flat panel displays, are known to those skilled in the art from the literature Steven W. Depp; Webster E. Howard: Flat-Panel-Displays, Scientific American, March 1993, pp. 40–45. They enable the direct input of data, typically in a graphically intuitive manner, on the screen. Sensitive flat screens are therefore simultaneously input and output media. Inputs take place, inter alia, using direct or indirect pointer/input devices. Examples of direct pointer/input devices are the so-called touchscreen, the light pen or the pen. It is characteristic of the pointer/input devices that in their case the interaction takes place directly on the display. In the case of indirect pointer/input devices, the input is not carried out directly on the screen. Although the screen here is not the input medium, indirect pointer/input devices can also be used sensibly together with sensitive flat screens. Known examples of indirect pointer/input devices are the keyboard, mouse, 3D mouse, track ball, joystick, graphic tablet and touchpad.

The use of direct pointer/input devices naturally comes to the fore in conjunction with the working surface according to the invention, because of its sensitive flat screen. In spite of this, it is sensible in many cases to make exclusive use of indirect pointer/input devices or to use them as supplement to the direct input devices.

Examples of flat panel displays which are common today are liquid crystal displays (LCD), in particular active matrix LCD panels, plasma displays (PDP) and electroluminescent displays (ELD) . The electronic working surface according to the invention can be produced with these conventional displays. It lies within the discretion of those skilled in the art to use other flat panel displays in the future, these possibly being based on other technologies.

The electronic working surface according to the invention is suitable for a series of user interface metaphors. The most important of these metaphors are

- the desktop metaphor, which is the basis of virtually all today's normal graphic user interfaces for personal computers, such as those from Apple (Macintosh), Microsoft (Windows) and other manufacturers; in the case of this metaphor, the impression of a desktop surface with objects located thereon is created;
- rooms as user interfaces; such a metaphor forms the basis, for example, for Apple's online information service, called E-World, or the Magic Cap system from General Magic see Wolfgang Müller: Steigende Netzspannung, Öffentliche Netzwerke [Rising Network Power, Public Network], SCREEN Multimedia, 3/94, pp. 20–23 and Mitch Radcliffe: Let Your Agent Do the Walking, Top of the News, PC World (56), February 1994; this metaphor can be implemented for example using a cubicle-shaped construction of the working surface;
- cyberspace user interfaces; these three-dimensional user interfaces are made possible for the user with the aid of data gloves or so-called head mounted displays.

Although other modifications and changes may be suggested by those skilled in the art, it is the intention of the inventors to embody within the patent warranted hereon all changes and modifications as reasonably and properly come within the scope of their contribution to the art.

We claim:

1. A modular and extendible electronic working surface having the following features:
   a) the working surface comprises a plurality of basic elements which are plugged together, at least one of said basic elements being functionally independent of other basic elements;
   b) the working surface can be enlarged or reduced or divided by the addition of further basic elements or by taking away basic elements;
   c) the top surface of at least one two basic elements are configured as a touch sensitive substantially flat screen with which data can be displayed and via which data can also be input into the working surface, the at least two basic elements in each case having at least one processor with which application programs can be processed;
   d) the side surfaces of a basic element are provide which devices which make possible the reversible plugging together of the basic elements and an exchange of data between the basic elements;
   e) at least some of the basic elements have a functionality which is independent of other basic elements, and at least some of the basic elements can exchange data via the devices, as a result of which a joint functionality of the respective basic elements is realized.

2. A modular and extendible electronic working surface as claimed in the claim 1, wherein at least one of said basic elements is equipped with a data memory.

3. A modular and extendible electronic working surface as claimed in claim 1, wherein at least one of said basic elements is equipped with a device for data transmission to and/or for data acceptance from an external data processing device and/or peripheral device and/or data communications network.

4. A modular and extendible electronic working surface as claimed in claim 1, wherein at least one of said basic elements is plugged together with another of said basic elements in such a way that the angle between these two basic elements can be varied.

* * * * *